UNITED STATES PATENT OFFICE.

PHILIP VICTOR WILLINGHAM GELL, CHARLES EDWIN GOULD, WILFRED MARSH HAMPTON, AND HAROLD SHARPE MARTIN, OF SMETHWICK, ENGLAND, ASSIGNORS TO CHANCE BROTHERS AND CO., LIMITED, OF SMETHWICK, ENGLAND.

COLORLESS CROOKES GLASS.

No Drawing.   Application filed May 11, 1925.   Serial No. 29,615.

This invention relates to an improvement of the well known Crookes glass which has heretofore been largely used in making spectacle lenses. The important property of this glass resides in its efficiency to absorb or retard the ultra-violet rays and thus prevent these rays from irritating the eyes of spectacle users, without appreciably reducing the transmission of visible light. The ingredients used to eliminate the objectionable rays have heretofore slightly colored the glass. It is well known, for example, that cerium is one of the most efficient ingredients of the Crookes glass to absorb these objectionable rays, but a pure cerium Crookes glass is of a yellow tint and this tint renders the glass objectionable.

Cerium for several reasons is probably the most convenient element to use in producing Crookes glass and it is the object of our invention to obviate the yellow tint that is characteristic of cerium while at the same time maintaining the efficiency of the glass to absorb the objectionable ultra-violet rays.

We have found that didymium while having the property in itself of absorbing the ultra-violet rays will also neutralize the yellow tint given to the glass by cerium, and when properly added to the glass in correct proportions with the cerium will neutralize the yellow tint imparted to the glass by the cerium and at the same time, together with the cerium will efficiently absorb the ultra-violet rays and thus produce a practically colorless Crookes glass.

The didymium has ultra-violet ray absorptive properties practically equal to that of cerium and in consequence the amount of cerium, and, therefore, of the yellow color, can be reduced to such an extent that the total content of cerium and didymium will give to the glass the required ultra-violet ray absorptive properties and at the same time the didymium will neutralize the coloring effect of the cerium in the glass and produce a practically colorless Crookes glass.

The other ingredients of the glass may be those in common use and the process of making the glass is that commonly employed. The proportion of cerium in the glass mix may vary somewhat above or below 3.3% and that of the didymium somewhat above or below 0.7%.

We do not, however, intend by specifying the use of cerium and didymium to limit our invention to the use of those two elements. Other elements known to the skilled glass maker have the property of absorbing ultra-violet rays such as titanium, vanadium, erbium, etc., but they are more expensive than cerium and as far as we know, they have never before been combined in such proportions as to produce the double effect of eliminating the objectionable rays while neutralizing their individual coloring effects and as far as we are aware we are the first to make use of two elements both of which will retard the ultra-violet and of which one will neutralize the color imparted to the glass by the other. By the use of two or more of such elements the quantity of each entering the glass batch may be reduced, and therefore, its coloring of the glass batch is correspondingly reduced and, furthermore, they may be mixed in such proportions that the coloring of one will be neutralized by that of the other.

By our invention, therefore, we have produced a glass highly efficient in absorbing or retarding the ultra-violet rays and at the same time we have produced a colorless glass having these properties.

Having thus described our invention what we claim as new and desire to secure by Letters Patent is:—

1. A glass for use in lenses, said glass containing cerium in sufficient quantities to partially absorb the ultra-violet rays and didymium in sufficient quantities to assist in the absorption of such rays and to neutralize the color that would be imparted to the glass by the cerium, and with the cerium to absorb practically all the ultra-violet rays.

2. A glass for use in lenses, said glass containing approximately 3.3% of cerium to partially absorb the ultra-violet rays and approximately .7% of didymium to assist in the absorption of such rays and to neutralize the color that would be imparted to the glass by the cerium and with the cerium to absorb practically all the ultra-violet rays.

In testimony whereof we have signed our names to this specification.

PHILIP VICTOR WILLINGHAM GELL.
CHARLES EDWIN GOULD.
WILFRED MARSH HAMPTON.
HAROLD SHARPE MARTIN.